(12) United States Patent
Divay et al.

(10) Patent No.: US 9,858,038 B2
(45) Date of Patent: Jan. 2, 2018

(54) CORRECTION MENU ENRICHMENT WITH ALTERNATE CHOICES AND GENERATION OF CHOICE LISTS IN MULTI-PASS RECOGNITION SYSTEMS

(71) Applicant: Nuance Communications, Inc., Burlington, MA (US)

(72) Inventors: Olivier Divay, Vieux-Vy sur Couesnon (FR); Joev Dubach, Somerville, MA (US); Venkatesh Nagesha, Wayland, MA (US); Allan Gold, Leicester, NC (US)

(73) Assignee: Nuance Communications, Inc., Burlington, MA (US)

( * ) Notice: Subject to any disclaimer, the term of this patent is extended or adjusted under 35 U.S.C. 154(b) by 485 days.

(21) Appl. No.: 13/756,862

(22) Filed: Feb. 1, 2013

(65) Prior Publication Data
US 2014/0223310 A1    Aug. 7, 2014

(51) Int. Cl.
*G10L 15/22* (2006.01)
*G06F 3/16* (2006.01)
*G06F 17/27* (2006.01)
*G10L 15/065* (2013.01)

(52) U.S. Cl.
CPC ............ *G06F 3/167* (2013.01); *G06F 17/273* (2013.01); *G10L 15/22* (2013.01); *G10L 15/065* (2013.01); *G10L 2015/221* (2013.01)

(58) Field of Classification Search
CPC ........ G06F 3/038; G06F 3/0488; G06F 3/167; G10L 15/193; G10L 15/22; G10L 15/30; G10L 15/265; G10L 21/06; G01C 21/3608; G01C 21/3629; G08G 1/096877
USPC ....... 715/706, 709, 727, 728, 762, 763, 771, 715/861; 704/231, 233, 235, 246, 260, 704/270, 270.1, 275, E11.011
See application file for complete search history.

(56) References Cited

U.S. PATENT DOCUMENTS

| | | | |
|---|---|---|---|
| 5,794,189 A | 8/1998 | Gould | |
| 6,167,377 A | 12/2000 | Gillick et al. | |
| 8,762,373 B1 * | 6/2014 | Zamir | G06F 17/30699 707/732 |
| 2001/0011218 A1 * | 8/2001 | Phillips et al. | 704/256 |
| 2005/0203751 A1 * | 9/2005 | Stevens et al. | 704/276 |
| 2006/0293889 A1 * | 12/2006 | Kiss et al. | 704/235 |
| 2008/0077386 A1 * | 3/2008 | Gao et al. | 704/3 |
| 2008/0109220 A1 * | 5/2008 | Kiss | 704/235 |
| 2008/0228482 A1 * | 9/2008 | Abe | 704/249 |

(Continued)

*Primary Examiner* — Rinna Yi
(74) *Attorney, Agent, or Firm* — Hamilton, Brook, Smith & Reynolds, P.C.

(57) ABSTRACT

A method is described for user correction of speech recognition results. A speech recognition result for a given unknown speech input is displayed to a user. A user selection is received of a portion of the recognition result needing to be corrected. For each of multiple different recognition data sources, a ranked list of alternate recognition choices is determined which correspond to the selected portion. The alternate recognition choices are concatenated or interleaved together and duplicate choices removed to form a single ranked output list of alternate recognition choices, which is displayed to the user. The method may be adaptive over time to derive preferences that can then be leveraged in the ordering of one choice list or across choice lists.

16 Claims, 5 Drawing Sheets

(56) References Cited

U.S. PATENT DOCUMENTS

2008/0270118 A1* 10/2008 Kuo ..................... G06F 17/273
              704/9
2009/0240488 A1* 9/2009 White et al. ..................... 704/9
2010/0305947 A1* 12/2010 Schwarz et al. .............. 704/252

* cited by examiner

CORRECTION MENU ENRICHMENT WITH ALTERNATE CHOICES AND GENERATION OF CHOICE LISTS IN MULTI-PASS RECOGNITION SYSTEMS

FIELD OF THE INVENTION

The present invention relates to speech recognition systems, and more specifically to choice lists for user correction.

BACKGROUND ART

An automatic speech recognition (ASR) system determines a semantic meaning of a speech input. Typically, the input speech is processed into a sequence of digital speech feature frames. Each speech feature frame can be thought of as a multi-dimensional vector that represents various characteristics of the speech signal present during a short time window of the speech. For example, the multi-dimensional vector of each speech frame can be derived from cepstral features of the short time Fourier transform spectrum of the speech signal (MFCCs)—the short time power or component of a given frequency band—as well as the corresponding first- and second-order derivatives ("deltas" and "delta-deltas"). In a continuous recognition system, variable numbers of speech frames are organized as "utterances" representing a period of speech followed by a pause, which in real life loosely corresponds to a spoken sentence or phrase.

The ASR system compares the input speech frames to find statistical models that best match the speech feature characteristics and then determines a corresponding representative text or semantic meaning associated with the statistical models. Modern statistical models are state sequence models such as hidden Markov models (HMMs) that model speech sounds (usually phonemes) using mixtures of Gaussian distributions. Often these statistical models represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the statistical models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or a list of several hypotheses, referred to as an N-best list. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

A common approach to improving the top choice accuracy of a speech recognition system is to use various forms of multi-pass recognition systems that combine results from multiple recognitions via confusion networks, and/or rescore a constrained lattice or network generated by a previous recognition pass. Over the past few years, component tuning has made speech recognition systems very efficient in terms of memory usage and response time at the cost of generating very small (and often unbalanced) recognition lattices, which are then converted into N-best choice lists. In the process, lattice links carrying words with low likelihood are pruned. This works well when the system is accurate, but when errors occur and the user brings up the correction menu to choose from a list of alternate choices, the choice list will often be very small or empty.

SUMMARY OF THE INVENTION

Embodiments of the present invention are directed to a method for user correction of speech recognition results. A speech recognition result for a given unknown speech input is displayed to a user. A user selection is received of a portion of the recognition result needing to be corrected. For each of multiple different recognition post-processing tools, a ranked list of alternate recognition choices is determined which correspond to the selected portion. The alternate recognition choices are combined together to form a single ranked output list of alternate recognition choices which is displayed to the user.

The method may further include receiving a user selection of one of the choices in the output list, and substituting the selected choice for the selected portion in the recognition result. The method may be adaptive over time to be speaker dependent; for example, based on or more of past user corrections, user-specific document data, and a user-specific usage corpora.

The different post-processing tools may include a text formatting post-processing tool, a homophone post-processing tool, aggregate user substitution data, and/or user substitution data specific to the user. The different post-processing tools may use recognition results from sequential and/or parallel speech recognition passes in a multi-pass speech recognition arrangement. A given post-processing tool may be disabled for a given user selection. The alternate recognition choices may be constrained by one or more language models.

An ordering rule that reflects an ordering of the different recognition post-processing tools may be used for interleaving and concatenating the alternate recognition choices and removing duplicate choices. For example, interleaving and concatenating the alternate recognition choices may place a first choice from each ranked list after a first choice from the output list, and then rank additional alternate recognition choices based on probability relative to the first choice in their original ranked list. Or it may be based on round robin alternation through the ranked lists in a desired order, or on associated probabilities of the alternate recognition choices which boosts a desired top alternate recognition choice to the top of the output list. In some embodiments, interleaving and concatenating the alternate recognition choices may be directly based on the associated probabilities of the alternate recognition choices, except that a desired top alternate recognition choice is boosted to the top of the output list, or more simply, may be directly based on the associated probabilities of the alternate recognition choices.

Determining the ranked lists may occur during a limited time period. In such an embodiment, if the ranked output list fails to include a minimum number of alternate recognition choices and time allows, then some or all of the different recognition post-processing tools may be used to re-determine ranked lists of alternate recognition choices for a next best recognition choice corresponding to the selected portion, and then the additional alternate recognition choices can be further combined together into the output list of alternate recognition choices. Enablement and ordering of the different recognition post-processing tools may depend on one or more of language, country, topic (e.g. legal, general, medical, etc.), and application.

DETAILED DESCRIPTION OF SPECIFIC EMBODIMENTS

Various embodiments of the present invention are directed to new choice list arrangements that combine recognition data from several different post-processing tools to produce a substantially better and richer choice list compared to using a conventional choice list from the final recognition result.

Figure 1:
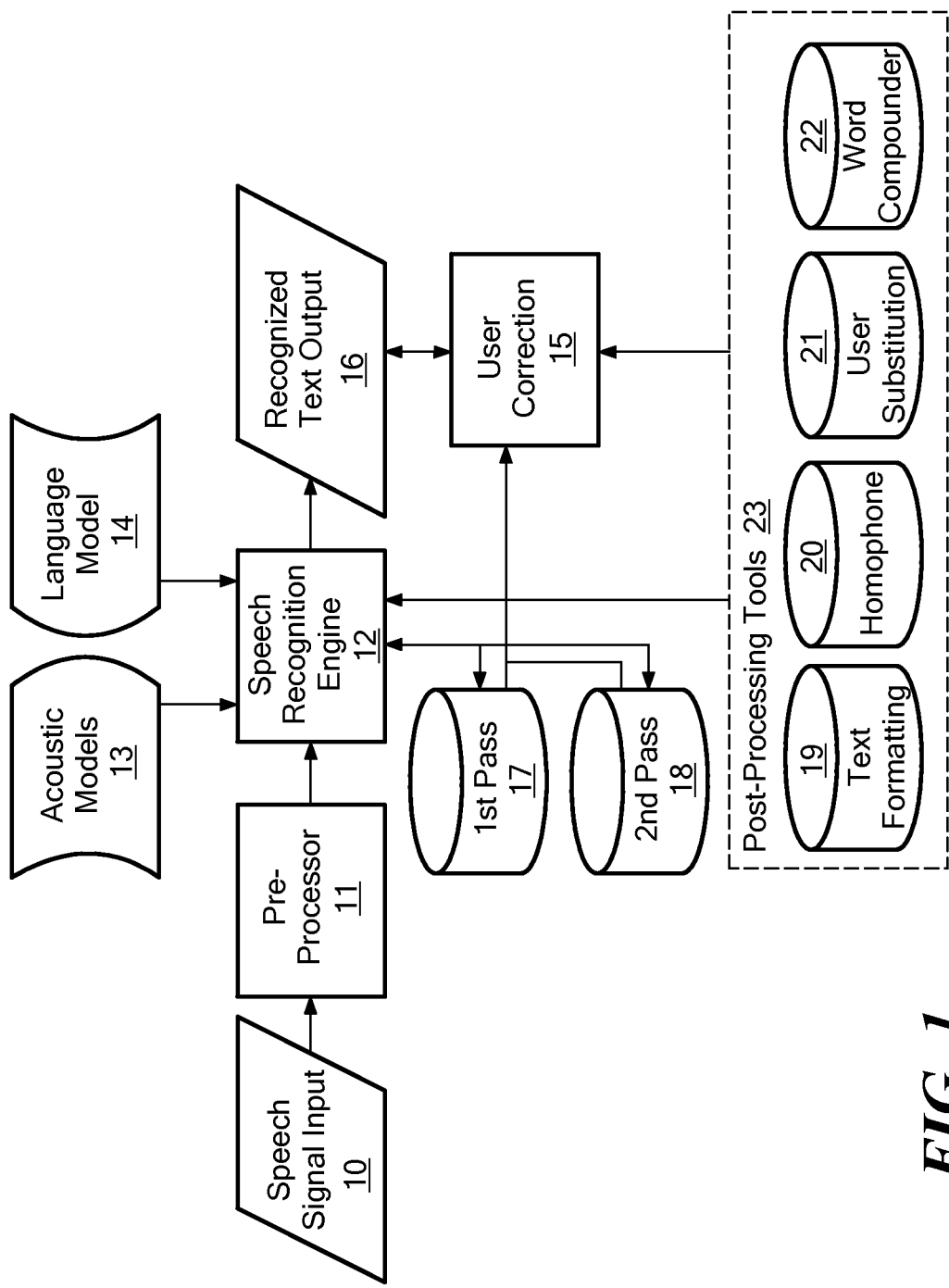
FIG. 1 shows various functional blocks in an automatic speech recognition system according to an embodiment of the present invention.
Figure 2:
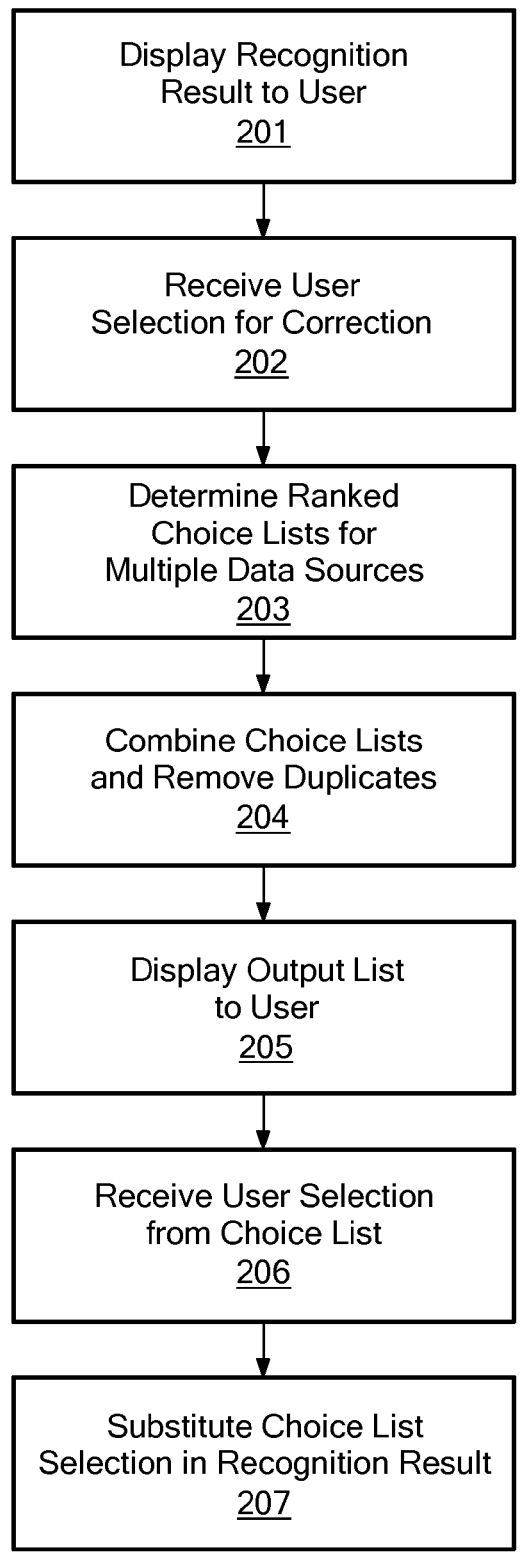
FIG. 2 shows various logical steps according to one specific embodiment.

FIG. 1 shows various functional blocks in an automatic speech recognition system and FIG. 2 shows various logical steps according to one specific embodiment of the present invention. Initially, speech signal input module 10 receives a speech input from a user and converts it into a representative electrical signal. Pre-processor 11 converts the speech input signal into a sequence of digital speech frames. The speech recognition engine 12 compares the sequence of speech frames to various acoustic models 13 and a language model 14 to determine a representative recognized text output 16 speech recognition result that is displayed to the user, step 201. More specifically, the speech recognition engine 12 often uses a multi-pass recognition arrangement in which the first recognition pass may perform simultaneous recognitions with some N different configurations of acoustic models 13, obtaining N $1^{st}$ pass recognition results 17. These are combined and re-recognized in a second recognition pass against a restricted grammar generated from this combined result, eventually generating final $2^{nd}$ pass recognition results 18.

Before the top/best choice of the $2^{nd}$ pass recognition results 18 are displayed to the user as the recognized text output 16, various post-processing tools 23 typically perform a series of output transformations such as word compounding, grammar checking, text formatting, etc. The post-processing tools 23 shown in FIG. 1 indicates three specific such tools: text formatting data 19, homophone data 20, user substitution data 21, and word compounder tool 22. These post-processing tools 23 are run in parallel and/or sequentially and may all discard, modify, add or re-order the recognition choices to make sure that the top choice is as accurate as possible. In the process, the recognition choice list usually shrinks as the post-processing transformations are made and duplicates removed. For example, "one hundred and one" and "one hundred one" both become "101". Once the post-processing is completed, the speech recognition engine 12 provides the top recognition choice to the user as the recognized text output 16.

But sometimes the user is unhappy with a portion of the recognized text output 16. The user selects the offending passage and invokes a correction menu. In a conventional multi-pass recognition arrangement, the final $2^{nd}$ pass results 18 are known to contain very few alternate recognition choices to present to the user. In addition, the richness of the recognition choice list is often unbalanced with more correction alternatives toward the beginning but little or nothing toward the end of the recognition results. Embodiments of the present invention address the need to enrich the choice list so that the user has multiple different alternate recognition choices to choose from as correction alternatives when misrecognitions occur.

A user correction module 15 receives a user selection of a portion of the recognition result that needs to be corrected, step 202. Then for each of multiple different recognition post-processing tools 23, the user correction module 15 determines a ranked list of alternate recognition choices which correspond to the selected portion, step 203. The post-processed choice-list from the $2^{nd}$ pass recognition is one obvious post-processing tool that is available to the user correction module 15, as are $1^{st}$ pass recognition result 17, as well as one or more of the previously discussed post-processing tools 23 such as the text formatting data 19, the homophone data 20, word compounder tool 22, and/or the user substitution data 21 which may include either or both of aggregate user substitution data and/or user substitution data specific to the user.

The user correction module 15 combines the alternate recognition choices together, step 204 to form a single ranked output list of alternate recognition choices, which is displayed to the user, step 205. For example, in some embodiments the user correction module 15 may use an ordering rule for interleaving and concatenating the alternate recognition choices to reflect an ordering of the different recognition post-processing tools, and then remove duplicate choices.

In addition or alternatively, enablement and ordering of the different recognition post-processing tools 23 may depend on one or more of language, country, topic (e.g. legal, general, medical, etc.), and application. The user may then select of one of the choices in the output list, step 206, and the selected choice may then be substituted for the selected portion in the recognition result, step 207.

Each post-processing tool 23 may have a set of correction parameters to control the elaboration of its choice list (maximum amount of items, pruning, etc.). One set of parameters may allow a model builder to turn off one or more post-processing tools, while another may control the ordering of appearance. A given client may also specify the overall number of correction items that should be provided.

For example, if the user correction selection is a single word, the user correction module 15 can obtain homophones from the homophone data tool 20 and may constrain them by ranking in context with the language model 14. If multiple words are selected, the user correction module 15 can obtain capitalization variants from the text formatting data 19.

In addition, some embodiments are able to learn from past corrections by adaptation over time to analyze frequencies of various formatting styles (e.g. date formatting, alternate written forms of words, capitalization usage) to derive preferences that can then be leveraged in the ordering of one choice list, or across choice lists. Thus if user substitution data 21 shows that a given user just uses the same two date formats, the user correction module 15 can ensure that the second (non-default) alternative comes first, and may not need to add any other date format to the correction list. Such adaptation may be based on one or more of past user corrections, user-specific document data, and a user-specific usage corpora, and may be implemented as an optional feature shared by the speech recognition engine 12 (allowing adaptation of the acoustic models 13 and/or the language model 14 becoming speaker dependent) and the post-processing tools 23. And the user correction module 15 may allow a given recognition post-processing tool to be disabled for a given user selection.

In Germanic languages, another example of useful specific post-processing tool 23 is the word compounding tool 22. For example, given some word sequence "A B C," the word compounding tool 22 identifies that in a given context this actually should become the one word "AB-C." If the word compounder tool 22 further remembers the transformation it's made to the top recognition choice, and the user then decides to correct the compound, then the word compounder tool 22 is given a chance to provide a list of alternative compounds, including the original word sequence "A B C".

For a multi-pass recognition arrangement, assume some N parallel recognition results, R[1], R[2], . . . R[N], each with post-processing tool choice lists C[1], C[2] . . . C[N]. These recognition results are combined to yield a final first pass recognition result R1 and a choice list C1. The first pass recognition result R1 may be followed by a second rescoring pass to yield result R2 and a choice list C2. Embodiments of the present invention replace C2 with an enhanced choice list Ce that is derived based on the following principles:

Top choice text and likelihoods are retained
Relative ordering and score differences of choice lists from each of the recognitions R[1] . . . R[N] are retained
The alternate recognition choices from each of the different recognition post-processing tools can then be concatenated and duplicates removed.

Such an approach does not need a process to normalize likelihoods from each of the individual recognitions, which is often quite difficult to implement. It also allows further manipulations of choice lists/likelihood in additional post-processing steps such as text formatting without additional changes. And word-level and acoustic/language model likelihoods can be carried forward without significant computations in latency-time.

For example, an embodiment may place a first result from each choice list after a first result from the final output list, and then ranking additional alternate recognition choices based on their probability relative to the first choice in their original choice list. So if the final recognition there were choices A1, A2, A3, and A4 with respective probabilities 1.4%, 1.3%, 1.2%, and 1.1%, and on an earlier result there were choices B1 and B2 with probabilities 5% and 2.5%, the final output list would intersperse these choices as A1, B1, A2, A3, A4, B2. Or an embodiment may interleave and concatenate the results based on a round robin alternation through the choice lists in a desired order—that would give A1, B1, A2, B2, A3, A4. Or associated probabilities of the results may be used directly, except that a desired top result is boosted to the top of the final output list—that would give A1, B1, B2, A2, A3, A4. Or associated probabilities of the results may be used directly—that would give B1, B2, A1, A2, A3, A4.

Response time is an important consideration. A given arrangement cannot spend too long crafting the best choice list or the user will quickly be annoyed with having to wait for the correction menu to pop up. It is relatively straightforward to monitor time and terminate post-processing when the elapsed time reaches some given threshold. In some embodiments, a control parameter may be provided to override the default processing time threshold, which can be overridden per model, or tuned dynamically based on the system. In other words, processing of the ranked lists may be determined during a limited time period. In such an embodiment, if the ranked output list fails to include a minimum number of alternate recognition choices and time allows, then some or all of the different recognition post-processing tools may be used to re-determine ranked lists of alternate recognition choices for a next best recognition choice corresponding to the selected portion, and then the additional alternate recognition choices can be further combined together into the output list of alternate recognition choices.

The top-choice (corrected text) may typically be the primary source used to generate post-processing correction alternatives, but the system may be able to back off to the next recognized choice if the ranked output list fails to include some minimum number of correction items and time allows.

Figure 3:
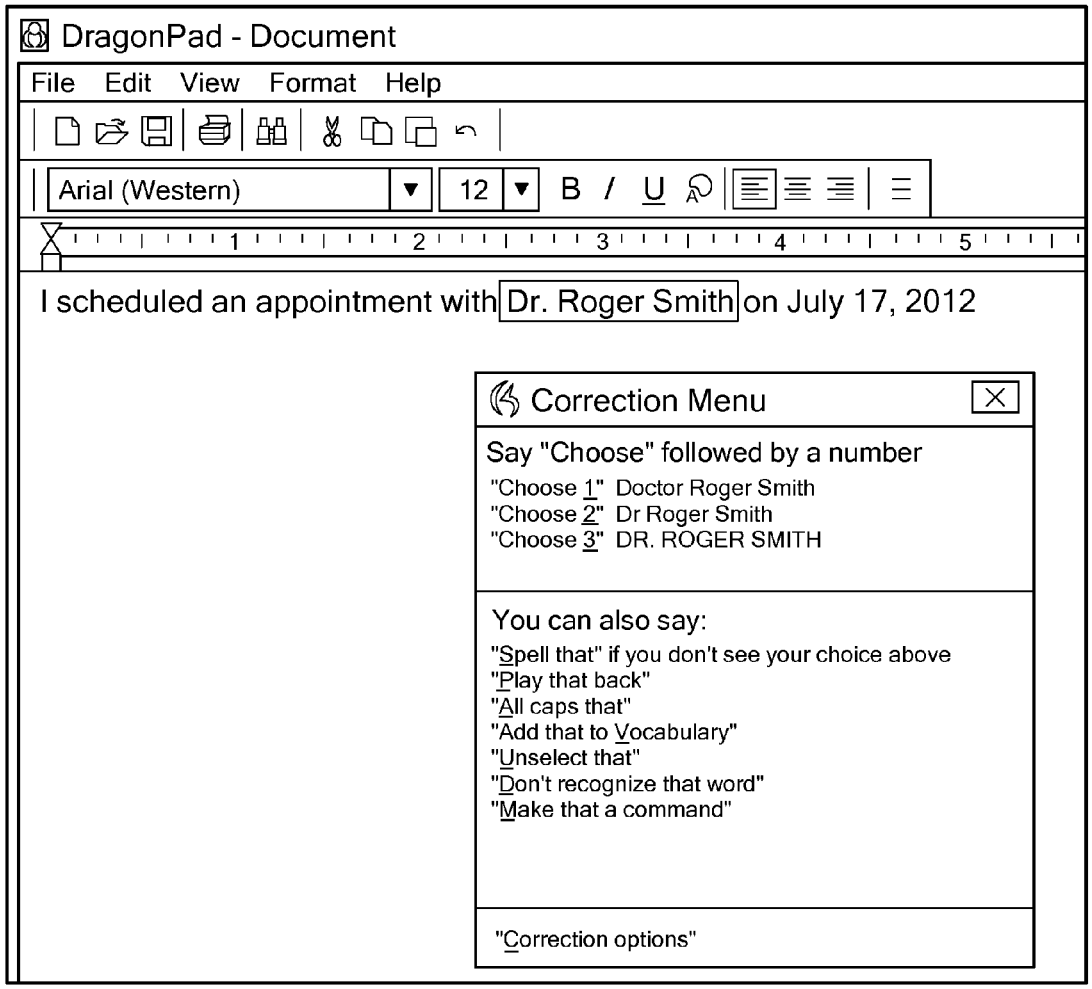
FIG. 3 shows example screens for user correction choice lists according to one embodiment of the present invention.

FIG. 3 shows an example screen for user correction choice lists where the recognition output displayed to the user is: "I scheduled an appointment with Dr. Roger Smith on Jul. 17, 2012." Here the user has selected a portion of the recognition result that needs to be corrected: "Dr. Roger Smith." Upon receiving such a correction input from the user, the system shows alternate written forms of the word "Doctor" (choices 1 and 2), followed by an uppercase variant of the full title+name (choice 3). The correction module chose not to display the lowercase variant in this case, because it makes little sense to do so.

Figure 4:
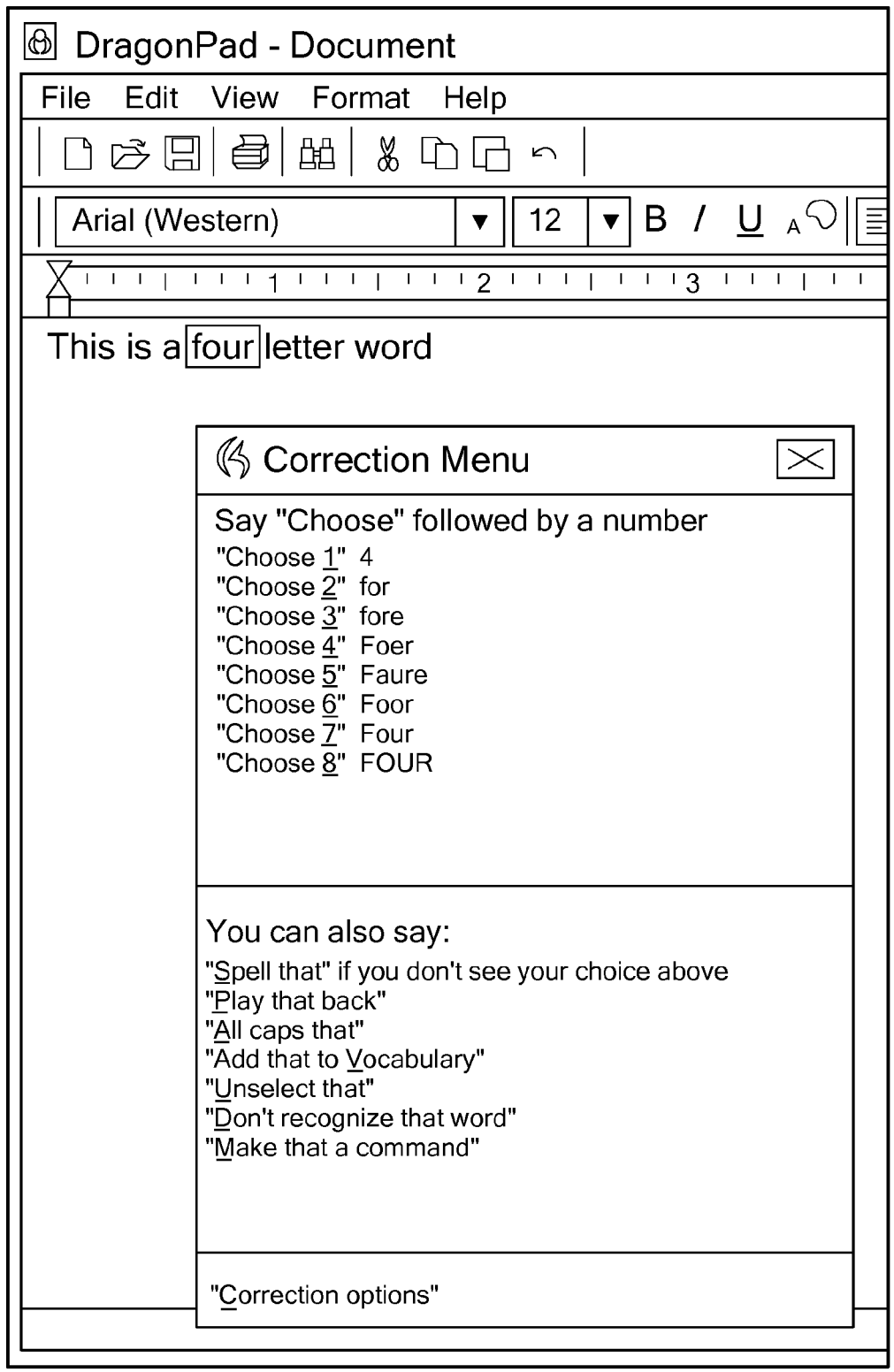
FIG. 4 shows another example screen of a user correction choice list according to an embodiment of the present invention.

FIG. 4 shows another example screen of a user correction choice list where the recognition output displayed to the user is: "This is a four letter word." Here the user has selected a portion of the recognition result that needs to be corrected, the word "four". The correction menu choice list shows a formatting alternative at the top as choice 1, followed by a series of homophones in choices 2 to 6, followed by capitalization variants in choices 7 and 8.

Figure 5:
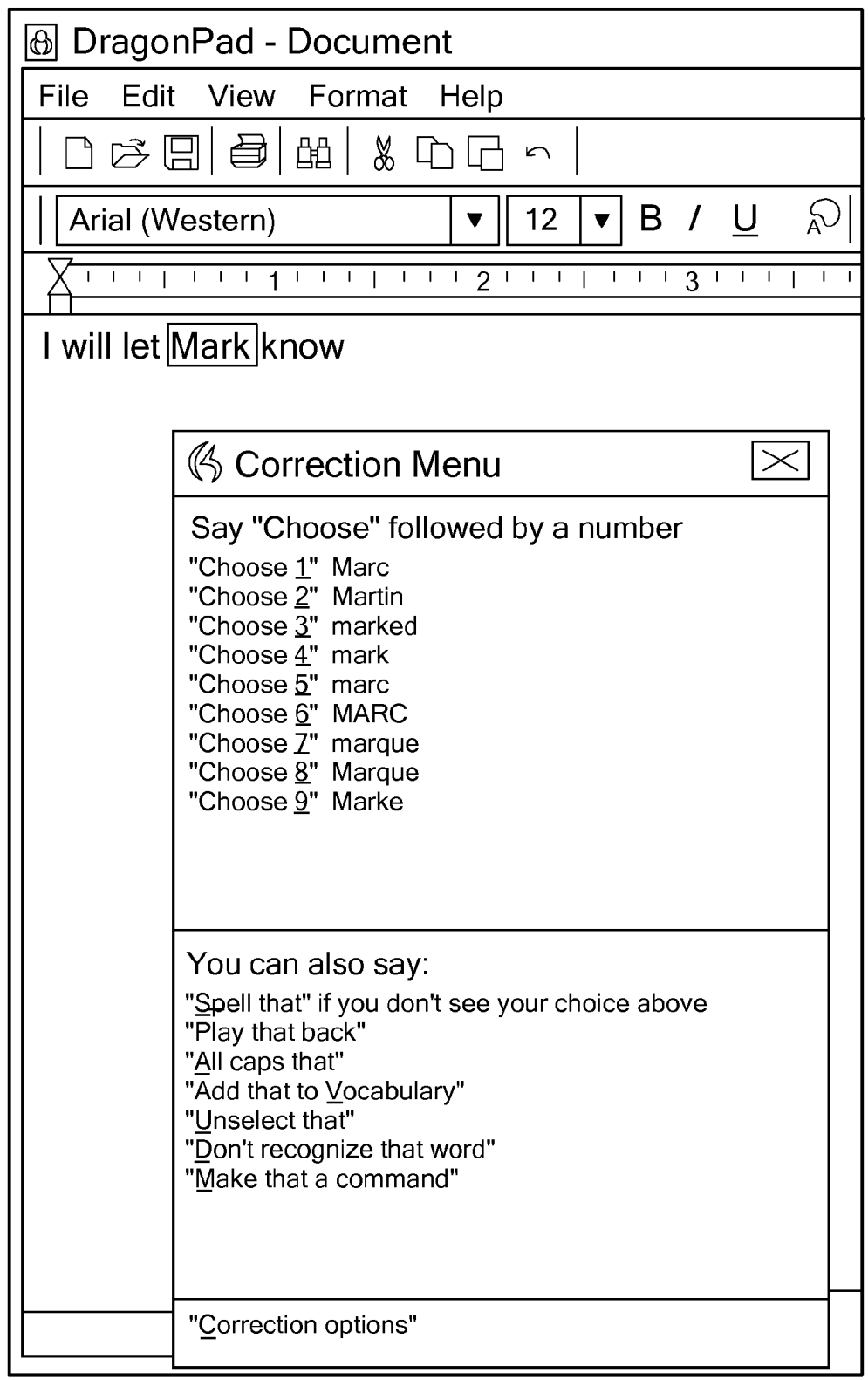
FIG. 5 shows a third example screen of a user correction choice list according to an embodiment of the present invention.

FIG. 5 shows a third example screen of a user correction choice list where the recognition output displayed to the user is: "I will let Mark know." Here the user has selected a portion of the recognition result that needs to be corrected, the word "Mark". The correction menu choice list shows multi-pass alternatives in choices 1 to 3, followed by homophones of the top-choice in choices 4 to 9 with decreasing likelihood. Note how "Marc" is a duplicate between the multi-pass choice list and the homophone choice list.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a tangible computer readable medium (e.g., a diskette, CD-ROM, ROM, or fixed disk). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method employing at least one hardware implemented computer processor for user correction of speech recognition results comprising:
   displaying, via a user interface, to a user a speech recognition result for a given unknown speech input;
   receiving, via the user interface, a user selection of a portion of the speech recognition result needing to be corrected;
   for each of a plurality of different recognition post-processing tools, determining a respective ranked list of alternate recognition choices corresponding to the user selection of the portion of the speech recognition result needing to be corrected, the plurality of different recognition post-processing tools including at least two of text formatting, homophone data, and word compounding;
   combining the alternate recognition choices determined by the each of the plurality of different recognition post-processing tools together to form a single ranked output list of the alternate recognition choices;
   displaying, via the user interface, the single ranked output list to the user for substituting the user selection of the portion of the speech recognition result needing to be corrected with one of the alternate recognition choices, wherein determining the respective ranked list for each of the plurality of different recognition post-processing tools occurs during a limited time period; and
   when each of the respective ranked lists fails to include a minimum number of alternate recognition choices and time allows, using some or all of the different recognition post-processing tools to determine additional ranked lists of alternate recognition choices for a next-best recognition choice corresponding to the user selection of the portion of the speech recognition result needing to be corrected; and
   further combining the additional alternate recognition choices together into the output list of alternate recognition choices.

2. The method according to claim 1, further comprising:
   receiving a user selection of one of the alternate recognition choices in the output list; and
   substituting the selected choice for the selected portion in the speech recognition result.

3. The method according to claim 1, wherein the method is adaptive over time to be speaker dependent.

4. The method according to claim 3, wherein the adaptation is based on one or more of past user corrections, user-specific document data, and a user-specific usage corpora.

5. The method according to claim 1, wherein combining the alternate recognition choices includes interleaving and concatenating the alternate recognition choices and removing duplicate choices.

6. The method according to claim 5, wherein interleaving and concatenating the alternate recognition choices places a first choice from each ranked list after a first choice from the output list, and then ranks additional alternate recognition choices based on probability relative to the first choice in their original ranked list.

7. The method according to claim 5, wherein interleaving and concatenating the alternate recognition choices is based on round robin alternation through the ranked lists in a desired order.

8. The method according to claim 5, wherein interleaving and concatenating the alternate recognition choices is directly based on the associated probabilities of the alternate recognition choices.

9. The method according to claim 5, wherein interleaving and concatenating the alternate recognition choices is directly based on the associated probabilities of the alternate recognition choices, except that a desired top alternate recognition choice is boosted to the top of the output list.

10. The method according to claim 1, wherein the different post-processing tools include speech recognition results from sequential speech recognition passes in a multi-pass speech recognition arrangement.

11. The method according to claim 1, wherein the different post-processing tools include speech recognition results from parallel speech recognition passes in a multi-pass speech recognition arrangement.

12. The method according to claim 1, wherein a given post-processing tool may be disabled for a given user selection.

13. The method according to claim 1, wherein an ordering rule may be used for combining the alternate recognition choices.

14. The method according to claim 13, wherein the ordering rule may reflect an ordering of the different post-processing tools.

15. The method according to claim 1, wherein the alternate recognition choices are constrained by one or more language models.

16. The method according to claim 1, wherein enablement and ordering of the different recognition post-processing tools depends on one or more of language, country, topic, and application.

* * * * *